(12) United States Patent
Mancosu et al.

(10) Patent No.: US 7,756,670 B2
(45) Date of Patent: Jul. 13, 2010

(54) METHOD AND A SYSTEM FOR DETERMINING THE ROUGHNESS OF A TYRE ROLLING SURFACE

(75) Inventors: Federico Mancosu, Milan (IT);
Massimo Brusarosco, Milan (IT);
Andrea Calatroni, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 807 days.

(21) Appl. No.: 10/577,251

(22) PCT Filed: Oct. 31, 2003

(86) PCT No.: PCT/IT03/00706

§ 371 (c)(1),
(2), (4) Date: Feb. 27, 2007

(87) PCT Pub. No.: WO2005/042322

PCT Pub. Date: May 12, 2005

(65) Prior Publication Data

US 2007/0255510 A1    Nov. 1, 2007

(51) Int. Cl.
*G01C 19/00* (2006.01)
*G01B 3/44* (2006.01)
*G01B 3/52* (2006.01)
*G01B 5/28* (2006.01)

(52) U.S. Cl. .................... 702/151; 702/34; 73/105

(58) Field of Classification Search ............. 702/33–36, 702/145, 148, 151, 167, 168, 17, 70, 81, 702/84, 141, 142, 190; 73/1.89, 105, 488; 701/70

See application file for complete search history.

(56) References Cited

U.S. PATENT DOCUMENTS

| | | | |
|---|---|---|---|
| 4,651,290 A | | 3/1987 | Masaki et al. |
| 5,245,867 A | * | 9/1993 | Sube et al. ............... 73/146 |
| 6,609,417 B1 | * | 8/2003 | Cantu et al. .............. 73/146 |
| 7,509,834 B2 | * | 3/2009 | Bauchot et al. .............. 73/8 |
| 2001/0022802 A1 | * | 9/2001 | Kurata .................... 374/45 |
| 2003/0005760 A1 | * | 1/2003 | Bulst et al. .............. 73/146 |
| 2003/0058118 A1 | | 3/2003 | Wilson |
| 2003/0095050 A1 | | 5/2003 | Mancosu et al. |
| 2004/0064219 A1 | * | 4/2004 | Mancosu et al. ............. 701/1 |
| 2005/0027473 A1 | * | 2/2005 | Davidson et al. .......... 702/151 |

FOREIGN PATENT DOCUMENTS

DE    195 37 257 A1    4/1996

* cited by examiner

*Primary Examiner*—Michael P Nghiem
(74) *Attorney, Agent, or Firm*—Finnegan, Henderson, Farabow, Garrett & Dunner, L.L.P.

(57) ABSTRACT

A method for determining the roughness of a tyre rolling surface by the steps of providing a first signal representative of the motion of at least one point of the tyre during rolling of the surface and processing the first signal for providing an output indicative of the roughness of the rolling surface of the tyre.

50 Claims, 6 Drawing Sheets

METHOD AND A SYSTEM FOR DETERMINING THE ROUGHNESS OF A TYRE ROLLING SURFACE

CROSS REFERENCE TO RELATED APPLICATION

This application is a national phase application based on PCT/IT2003/000706, filed Oct. 31, 2003, the content of which is incorporated herein by reference.

BACKGROUND OF THE INVENTION

1. Field of the Invention

The present invention refers to measuring devices associable with a tyre mounted on a vehicle.

2. Description of the Related Art

The use of measuring devices placed inside a tyre for the detection of specific quantities which characterise the operating conditions of the tyre itself are known.

The patent application US-A-2003/0058118 describes, amongst others, a detection device for the road surface contact area of a tyre under load. Such a detection device incorporates a radial accelerometer having the detection axis aligned with the radius of the wheel onto which the tyre is mounted. This radial accelerometer provides a signal from which is received, by means of elaborations, information relating to the contact area. In this patent application it is specified that these elaborations also include a low frequency filtering operation for removing the "road noise" associated with the presence of potholes, stones and gravel.

The patent application US 2003/0095050 describes a device for the continuous measurement of deformations of the tyre, originating from which information relating to the vertical compression of the tyre and the type of manoeuvre (advancement in a straight or curved line) performed by the vehicle are obtained. The sensor device described in this patent application includes a light emitter mounted on the supporting rim of the tyre and a reflective surface fixed to one inner wall of the tyre.

SUMMARY OF THE INVENTION

The Applicant has dealt with the problem relating to the fact that the measuring apparatus to be associated with tyres described in the known art provide a limited typology of information. In particular, the Applicant has observed that the conventional systems and methods of measurement associated with tyres do not allow the collection of information relating to the surface on which the tyre is rolling.

The Applicant has observed that the limitations presented by the conventional measuring devices may be overcome by extracting, from the signal supplied by a measuring device associated with a tyre, an output indicative of the roughness of the surface on which the vehicle advances and on which the tyre rolls. Information associated with the roughness of the tyre rolling surface, such as the road surface, may find very useful application in monitoring and/control systems with which the vehicle itself may be equipped. For example, such information may have an important role in the checking stages carried out by an ABS (Anti Blocking System) system.

According to a first aspect, the present invention refers to a method for determining the roughness of the rolling surface of a tyre, including: providing, by means of a sensor device operatively associated with the tyre, a first signal representative of the motion of at least one point of the tyre during its rolling on the surface; processing the first signal for providing an output indicative of the roughness of the rolling surface of the tyre; and wherein the processing includes a frequency filtering of the first signal for extracting a second signal representative of motion components of the at least one point due to the deformations undergone by the tyre during the rolling.

In accordance with a second aspect, the invention refers to a method for checking the behaviour of a vehicle, including: determining information relating to the roughness of a rolling surface of the tyre; and making available the information relating to the roughness to a vehicle control system.

In agreement with a third aspect, the invention refers to a system for determining the roughness of a tyre rolling surface, the system being operatively associable with the tyre and including: a sensor device operatively associated with the tyre for providing a first signal representative of the motion of at least one point of the tyre during the rolling of said tyre on a surface having a respective roughness; a processing stage of the first signal for generating an output indicative of the roughness of the tyre rolling surface; and wherein the processing stage is of such a type as to perform a frequency filtering of the first signal for extracting a second signal representative of components of motion of the at least one point due to deformations undergone by the tyre during rolling.

According to a fourth aspect, the present invention refers to a tyre, including: a sensor device operatively associated with the tyre for providing a first signal representative of the motion of at least one point of the tyre during the rolling of the tyre on a surface having a respective roughness, said sensor device comprising a processing stage of the first signal for generating an output indicative of roughness of the tyre rolling surface; and wherein the processing stage is so as to perform a frequency filtering of the first signal for extracting a second signal representative of motion components of the at least one point due to deformations undergone by the tyre during rolling. A wheel including a supporting rim and a tyre having the above-discussed features and associated with said supporting rim also forms a subject of the invention.

BRIEF DESCRIPTION OF THE DRAWINGS

In order to better understand the invention and appreciate the advantages, some of its non limiting exemplificative embodiments are described in the following, making reference to the enclosed drawings, wherein.

DETAILED DESCRIPTION OF THE INVENTION

Figure 1:
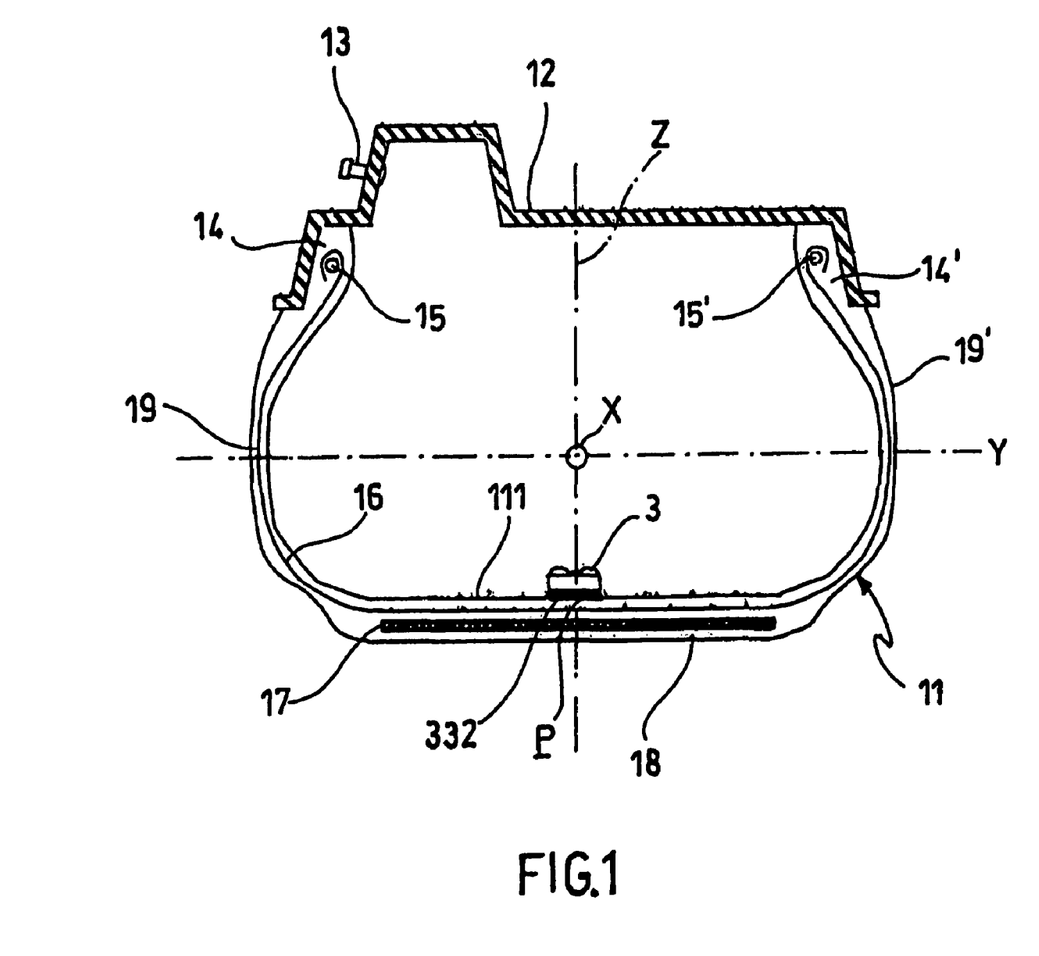
FIG. 1 shows a cross section of a tyre to which a sensor device in accordance with a particular example execution of the invention is fixed.
Figure 2:
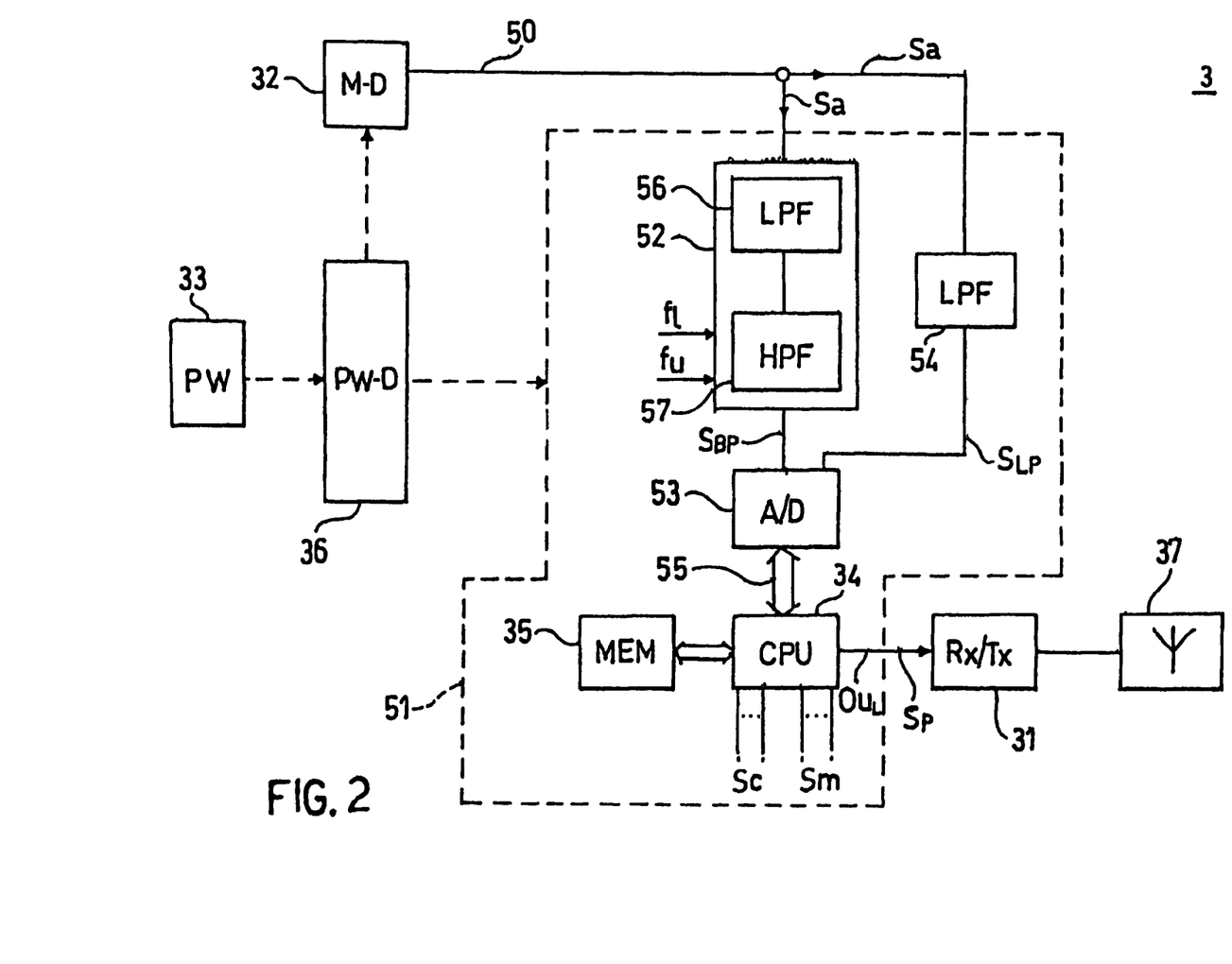
FIG. 2 shows schematically, and by functional blocks, an example of a sensor device in accordance with the invention.
Figure 3:
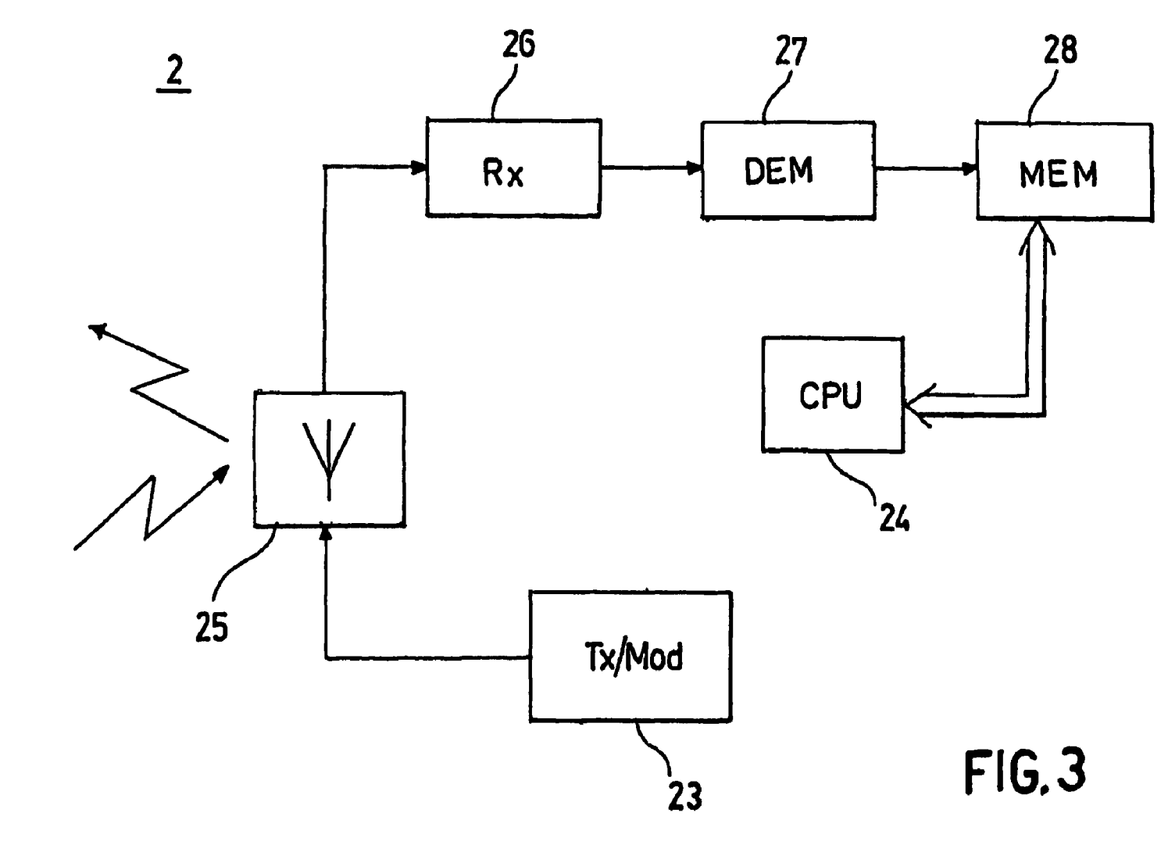
FIG. 3 shows schematically and by functional blocks, an example of a fixed unit in accordance with the invention and installable on board a vehicle.

With reference to FIGS. 1, 2 and 3 an example of a measurement system operatively associable with a vehicle (not shown) tyre 11, in accordance with the invention, is described in the following. Such a system allows the attainment of information related to the level of roughness of a surface on which the vehicle advances. Advantageously, the system of the invention is able to provide this "run time" information, i.e. it may operate during the advancement of the vehicle, making the information related to the roughness, essentially of the same surface on which the vehicle is advancing, available. It is noted that, as will be apparent from the description which follows, the system of the invention (which may include the same tyre to which it is associated) may also have components or blocks of components not fixed to the tyre but arranged on board the vehicle or fixed to a wheel to which the tyre is mounted. In any case, such a system is to be considered as operatively associable with the tyre since it is provided with at least one component which in its operation interacts with the tyre, or with its parts, in particular during the rolling of the tyre itself.

According to the described example, the system of the invention comprises a sensor device 3 operatively associated with the tyre 11 and, optionally, a fixed unit 2 arranged on board the vehicle.

According to one particular embodiment of the invention the sensor device 3 is fixable to the tyre 11 and, in particular, is mountable inside the cavity identified by the tyre itself. With reference to this embodiment, FIG. 1 shows a cross section of the wheel of a vehicle comprising the tyre 11 and a supporting rim 12. Such a tyre 11 is of the type known by the term "tubeless" i.e., without an inner tube. The tyre 11 is inflatable by means of an inflation valve 13, positioned, for example, on the channel of said supporting rim 12.

The tyre 11 includes a carcass 16, terminating in two beads 14 and 14' each formed along one inner circumferential edge of the carcass 16, for fixing the tyre 11 to the corresponding supporting rim 12. The beads 14 and 14' comprise respective reinforcing annular cores 15 and 15', known as bead cores.

The carcass 16 is formed by at least one reinforcing ply, including textile or metallic cords, which extend axially from one bead 14 to the other 14' in a toroidal profile, and having its ends associated with a respective bead core 15 and 15'.

In conventional tyres of the type known as "radial", the aforementioned cords lie in a plane containing the axis of rotation of the tyre. An annular structure 17, known as the belt, is placed in a radially external position with respect to the carcass 16. Typically, the belt structure 17 includes one or more strips of elastomeric material incorporating metal and/or textile cords, which overlap one another. A tread band 18, in elastomeric material, is wound around the belt structure 17 and has a plurality of relief or block patterns (not shown), distributed according to a particular configuration, for the contact with a rolling surface, such as the road surface. Two sidewalls 19 and 19', in elastomeric material, are also placed on the carcass in radially opposed lateral positions, each extending radially outwards from the outer edges of the corresponding beads 14 and 14'.

In tubeless tyres the inner surface of the carcass 16 is normally covered with a protective coating 111, known as liner, made up of one or more protective layers of air-impermeable, elastomeric material. The tyre 11 may be fitted with other conventional elements or components according to its specific typology such as, for example, fillings for the beads.

As is indicated in FIG. 1, the following basic directions are definable for the tyre 11: radial direction Z, longitudinal direction (or of advancement) X and transverse direction Y.

According to the example of FIG. 1, the sensor device 3, the structure of which will be exemplificatively described later, is placed on an inner wall of the tyre 11 opposite the tread 18. More particularly, it is found, essentially, in the centre line of the tyre 11 aligned with the radial axis Z.

The sensor device 3 is fixed in at least one observation point P of the inner liner 111 by a fixing element 332 which adheres both to one wall of a casing on the sensor device 3 and also to the liner itself. It is observed that according to the present invention with the term "point" is meant a region or part of the tyre 11 with not null dimensions but, however, small with respect to that of the entire tyre, the effective value of which depends on the resolution of the sensor device 3.

The fixing element 332 is made from flexible rubbers, such as, natural or synthetic rubber (for example, rubber made from conjugated dienes having from 4 to 10 carbon atoms such as poly-isoprene, poly-butadiene, styrene-butadiene rubber and the like). The fixing element 332 also has, advantageously, a protective effect for the sensor device 3 thus reducing the probability of damage.

According to alternative forms of execution, the sensor device 3 may be incorporated within the structure of the tyre 11 in the region of the tread 18 and, for example, inside the tread band itself, or between the belt 17 and the tread 18.

It is observed that sensor devices, fixed, not to one wall of the tyre 11 but, for example, to the supporting ring 12 and/or sensor devices not placed in the centre line of the tyre but fixed or incorporated into the side walls 19 and 19' of the tyre 11, or in other regions of the same may also be used.

Furthermore, in accordance with the present invention a plurality of sensor devices 3 associated with the tyre 11 itself may be used. In particular, sensor devices placed in positions circumferentially distanced from one another, essentially by a fixed angle, may be used. For example, three sensor devices, analogous to the device 3, placed circumferentially inside the tyre 11, and distanced from one another by an angle approx. equal to 120° may be used.

With reference to FIG. 2, according to one particular example embodiment, the sensor device 3 includes a measuring device (M-D) 32 such as to provide to a corresponding output terminal 50 an electric signal representative of the motion in at least one direction of said at least one point P of the tyre itself during its rolling on the road surface. Advantageously, the measuring device 32 is of such a type as to provide to the output 50 an electrical signal also representative of the components of motion of the observation point P due to the deformations undergone by the tyre 11 during rolling. It is observed that the deformations of the tyre 11 detectable by the measuring device 32 are also those induced by the roughness of the surface on which the tyre rolls, i.e. those roughness due to the particular texture of the road surface.

According to one preferred form of execution of the invention, the measuring device 32 is an accelerometer such as to provide at least one signal representative of the acceleration undergone by said point P of the tyre along one or more of the following directions (defined in accordance with the terminology normally used in the sector): radial or centripetal direction Z, longitudinal direction (or of advancement or tangential) X, lateral direction Y.

Measuring devices suitable for being used in the present invention are commercially available and are, for example, made using MEMS (Micro-Electro-Mechanical-Systems) technology, or are for example, optical or acoustic sensors.

With regard to that, the above cited patent application US-A-2003/0095050 describes an optical type sensor used for the measurement of the footprint area of the tyre, which may be used in the present invention in order to generate a signal representative of components of the motion of the observation point P due to deformations undergone by the tyre 11 during rolling. This type of optical sensor is fixable to the rim 12 and is capable of detecting the movements of the prefixed observation point P of the tyre 11, lying on any inner wall of the same, to which an adequate reflective surface of the optical radiation emitted by the optical sensor may be applied.

According to one example embodiment of the invention, the sensor device 3 additionally comprises a processing stage 51 of the signal provided by the measuring device 32 for providing an output that is indicative of the roughness of the rolling surface of the tyre 11.

It is noted that the processing stage 51 may include circuit blocks for the treatment of analogue signals and/or circuit blocks for the treatment of digital signals. Furthermore, the aforementioned processing of the output signal from the measuring device 32 may be performed entirely or in part via software, i.e. in the execution of an electronic data processor (computer) program.

With reference to the particular embodiment shown in FIG. 2, the processing stage 51 includes a filtering block 52 having an input terminal connected to the output 50 of the measuring device 32 and an output terminal connected to the input terminal of a analogue-digital (A/D) converter 53.

The filter block 52 is such as to carry out band pass filtering and has been outlined in FIG. 2 as the in series connection of a first low pass filter (LPF) 56 and a high pass filter (HPF) 57. These filters 56 and 57 may be composed, for example, from conventional analogue filters.

The passing band B of the filter block 52 is selected in such a manner as to extract from the acceleration signal present at the output terminal 50, a part which contains frequency components, the origin of which is referable to the stresses induced by the roughness of the road surface on the structure of the tyre 11. Furthermore, such a passing band B is selected in such a manner as to reduce or, substantially eliminate those low frequency components relating to phenomena which are of no interest such as, for example, phenomena correlated with the vertical load, skidding or to drift.

The pre-selected passing band B is identified by the lower cut-off frequency $f_l$ and the upper cut off frequency $f_u$ of the filtering block 52. Advantageously, the passing band B is included between 300 Hz and 5000 Hz and, preferably, between 300 Hz and 2500 Hz, or, more preferably, between 500 Hz-1200 Hz.

The above indicated passing band values B have been determined experimentally by the Applicant and have emerged as being suitable for the extraction of the frequencies of interest from an acceleration signal. With reference to that the Applicant has noted that the vibrations of the structure of the tyre 11 during its rolling on the road surface have an amplitude which is directly related to the amplitude of the roughness of the road surface itself and furthermore, that the frequency band to be extracted, using the filtering block 52, is dependent on the exact modes of vibration of the structure of the tyre 11 for stresses having a frequency corresponding to the particular excitatory wavelengths of the specific road surface. It is observed that the above indicated frequency intervals have emerged as being in good agreement with those qualitative theoretical considerations relating to the stresses on the tyre due to the surface on which it rolls.

According to one particular form of execution of the invention, the high pass filter 57 and the first low pass filter 56 may have respective cut-off frequencies of less than the $f_l$ and greater than the $f_u$ constants (and in particular, constants varying with the angular velocity of the tyre 11) and such that the corresponding passing band B is within the above indicated values.

Alternatively, the high pass filter 57 and the first low pass filter 56 may be of the tracking type and i.e. having the lower cut-off frequency $f_l$ and/or the higher cut-off frequency $f_u$ not fixed but modifiable or adjustable through respective control signals transmittable to the filters themselves. In particular, the upper and lower cut-off frequencies $f_l$ and $f_u$ may vary with the variation of the angular velocity of the rolling of the tyre. In such a case, the lower and upper cut-off frequencies may be estimated using the following equations:

$$f_l = n_l \frac{1}{2\pi} \sqrt{\frac{a_i}{r_g}} \tag{1}$$

$$f_u = n_u \frac{1}{2\pi} \sqrt{\frac{a_i}{r_g}} \tag{2}$$

wherein:
$a_i$: centripetal acceleration of the tyre during the $i^{th}$ rotation,
$r_g$: inflated radius of the tyre,
$n_l$: lower harmonic component;
$n_u$: upper harmonic component.

According to the equations (1) and (2) the upper and lower cut-off frequencies are multiple, according to the factors $n_l$ and $n_u$, of the instantaneous angular velocity $\omega_p$ of the tyre, depending on the centripetal acceleration, to, and from the inflated radius $r_g$ of the same.

The factors $n_l$ and $n_u$ take account of the number of block patterns with which the outer surface of the tread 18 of the tyre 11 is provide which influences the number of the harmonic components of the vibrations of the tyre itself. For example, in the case of an overall number of block patterns present on the tread 18 equal to n, it is possible to assume that the harmonic components of the vibrations of the tyre are equal to exactly n. The value $n_l$ of the lower harmonic component is less than the value n, and the value $n_u$ of the upper harmonic component is greater than the value n, in such a manner that they identify an interval which includes the harmonic components of interest. According to one particular embodiment, the value $n_u$ of the upper harmonic component is close to the number of block patterns n, in such a manner as to be less than 2n.

For example, for a number of block patterns n=70, $n_l$ may be selected equal to 65 and $n_u$ is selected equal to 75. With such exemplificative values of the lower and upper harmonic components, for an angular velocity of the tyre $\omega_p$ equal to 100 Km/h, by applying the equations (1) and (2), one obtains an upper cut-off frequency $f_l$ equal to 930 Hz and a lower cut-off frequency $f_u$ equal to 1070 Hz.

Alternatively, it is possible to select the value $n_u$ in such a manner that it is equal to or greater than a multiple of n. In other words, the value $n_u$ may be equal to or greater than 2n or to other multiple of n (3n, 4n, etc.). In this manner one also takes into account the contribution to the phenomenon associated with the higher order harmonics.

As will be described further below in greater detail, according to the form of execution of the invention which uses tracking type low pass 56 and high pass 57 filters, the values of the lower and upper cut-off frequencies may be calculated according to equations (1) and (2). (for example, at each revolution of the tyre 11) and then fed to the respective filters.

Both in the case of tracking filters and in the case of fixed cut-off frequency filters, the first low pass filter 56 and the high pass filter 57 may be of a conventional type such as, for example, the discrete level type which allows the regulation of the cut-off frequency in a non continuous manner but by degrees or pre-fixed steps, according to the angular velocity of the tyre.

The processing stage 51 is also equipped with a second low pass filter (LPF) 54 for the determination of secondary parameters and a processing unit (CPU) 34 having a corresponding input terminal connected to the output terminal 50 and a corresponding output terminal connected to the input of an analogue-digital converter 53.

In general the cut-off frequency $f_t$ of the second low pass filter 54 is less than or equal to the lower cut-off frequency $f_l$ of the band pass filter stage 52. Preferably, the cut-off frequency $f_t$ is less than 300 Hz. For example, in the case of a velocity dependent filter, the second low pass filter 54 has a cut-off frequency $f_t$ equal to approx. 40 Hz at 20 km/h and equal to approx. 240 Hz at 100 km/h.

The second low pass filter 54 may have a constant cut off frequency $f_t$ or may be of the tracking type and have a cut-off frequency adjustable with the angular velocity $\omega_p$ of the tyre 11, in turn calculatable, in accordance with the invention, as exemplificatively described further below. In particular, the cut-off frequency $f_t$ is proportional to the angular velocity $\omega_p$ according to a preset factor K:

$$f_t = K \frac{1}{2\pi} \omega_p \qquad (1')$$

The factor K (for example, an integer greater than 1) is dependent on the type of tyre under consideration and, for example, may be selected on the basis of its dimensions in order to extract harmonic components which describe the motion of the particular tyre under consideration in a sufficiently complete manner.

Furthermore, a processing unit (CPU) 34 associated with a memory device (MEM) 35 and connected through a bus 55 to an analogue-digital converter 53 is included in the processing stage 51 for receiving from the converter 53 digital values.

The processing unit 34 made, for example using a conventional microprocessor, is such as to carry out the elaborations of the digital data stored in the memory device 35 and/or originating from the analogue-digital converter 53 for the generation of the output, representative of the roughness of the road surface. Advantageously, this processing unit 34 may also perform a control and monitoring role for the measuring device 32 and the other blocks included in the sensor device 3, through control signals Sc and monitoring signals Sm_(originating from the devices or the blocks being monitored) made available over relevant control/monitoring lines. For simplicity of representation, the control/monitoring lines connected to the corresponding components of the sensor device 3 have been omitted from FIG. 2.

The processing unit 34 has at least one output line $OU_L$ over which is provided at least one output signal, $S_p$, resulting from the processing and carrying at least the information relating to the roughness of the road surface.

It is observed that the measuring device 32 and some of the blocks of the processing stage 51 may also be used in order to generate, in addition to the signal relating to roughness, also other output signals carrying other information deducible from the signal produced by the measurement device itself. For example, the processing unit 34 may provide signals carrying data relating to the present acceleration and to the present angular velocity of the tyre or information relating to other operating conditions of the tyre such as, for example, the vertical load acting on the tyre.

Furthermore, the sensor device 3 includes a conventional transceiver (Rx/Tx) device 31 connected to the output line $OU_L$ and to an antenna 37 in order to allow the reception and transmission of signals to/from the fixed unit 2 installed on board the vehicle.

The sensor device 3 is equipped with an electrical power source (PW) 33 such as, for example, a battery. However, it is possible that the processes performed inside the sensor device 3 and the processing associated with the transceiver device 31 make the lifetime of the battery short, if compared with the lifetime of the tyre 11. Therefore, according to preferred forms of execution the power source 33 includes a self-charging device (not shown), which generates electrical energy resulting from the mechanical stress to which the self-charging device itself is subjected (for example, centrifugal force, or the deformations of the liner 111 or movements due to the advancement over non-uniform roads). For example, the self-charging device may include one or more components in piezoelectric material. The self-charging device also includes an electrical energy storage circuit (not shown) typically comprising a resister and a capacitor. As a further alternative, the sensor device 3 may be supplied by the fixed unit 2 though a suitable receiving device (not shown), connected to the moveable antenna 37. Preferably, an electrical energy distribution device (PW-D) 36 distributes the electrical power provided by the power source 33 in an appropriate manner to the processing unit 34, the memory device 35, the transceiver device 31 and the measuring device 32, according to their requirements.

It is useful to note that it is not necessary to include all the components of the above described sensor device 3 (such as for example, the measuring device 32, the transceiver device 31 and, and the processing stage 51) in the same casing or package. For example, the processing stage 51 and the transceiver device 31 may be included in a casing which is separate from that in which the measuring device 32 is included and fixed to other parts of the tyre 11 or the wheel (for example, to the supporting rim 12) and associated with a cable or wireless connection (for example, by means of optical waves or by radio frequency). In such a case, the measuring device 32 may be placed, for example, in a casing fixed to the tyre analogously to that shown in FIG. 1 for the sensor device 3.

FIG. 3 shows, using functional blocks and in a very diagrammatical manner, an example embodiment of the fixed unit 2 useable in the system of the present invention. Preferably, the fixed unit 2 comprises a receiver device (Rx) 26 (for example, a radio frequency receiver) connected to a fixed antenna 25 in such a manner as to allow the reception of the signals transmitted by the sensor device 3. Preferably, the receiver device 26 is connected to a demodulator (DEM) 27 for the demodulation of the data received. A memory unit (MEM) 28 such as for example, an EPROM, may store the data received from the sensor device 32 and demodulated by the demodulator 27. The memory unit 28 may be associated with an additional processing unit (CPU) 24, having the role of carrying out the elaborations and calculations of the data received from the sensor device 3 and/or stored within the memory unit 28 and, for example, controlling the components of the fixed unit 2. Furthermore, the fixed unit 2 preferably includes a transmission and modulation device (Tx/Mod) 23 suitable for transmitting signals to the sensor device 3.

The method of calculation of one or more parameters representative of the roughness of the road surface or of another test surface on which the tyre 11 rolls implementable, for example, using the sensor device 3 will now be described.

The particular case wherein the measuring device 32 is an acceleration sensor which returns to the output terminal 50 at least one signal Sa indicative of the temporal acceleration trend of the point of observation P of the tyre 11 is considered. For example, the exemplificative case wherein the signal Sa is representative of the radial or centripetal acceleration (i.e. along the direction Z) of the point of observation P of the tyre 11 is considered.

Figure 4:
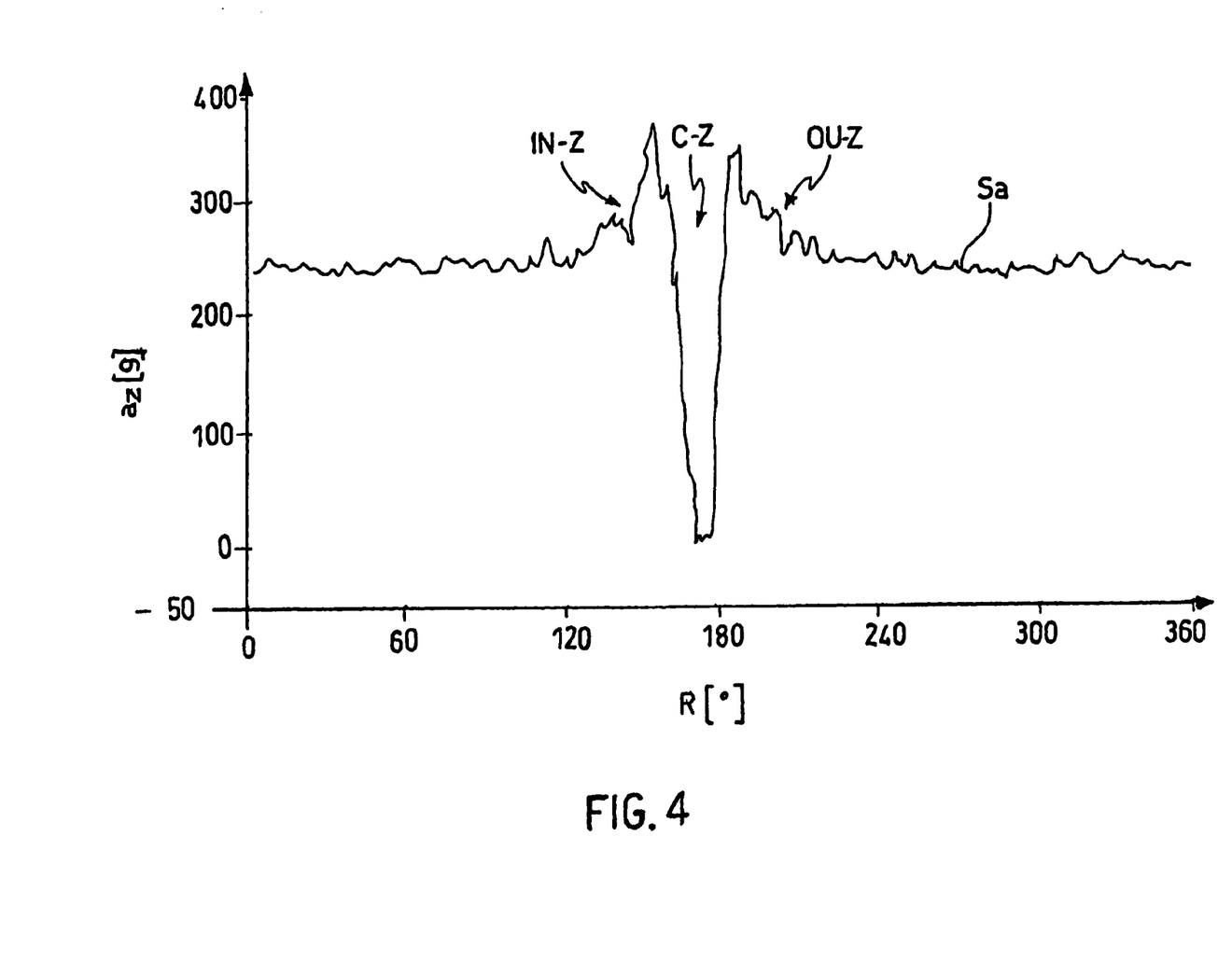
FIG. 4 shows qualitatively the behaviour of an acceleration signal obtainable from said sensor device.

In order to better understand the following treatment, FIG. 4 shows one possible trend of such an acceleration signal Sa, representing the amplitude of the centripetal acceleration $a_z$ (expressed in multiples of g) as a function of the angle of rotation R (variable between 0° and 360°) and estimated for a pre-fixed angular velocity $\omega_p$ of the tyre 11. The trend of FIG. 4 refers to one complete revolution carried out by the tyre 11.

From the observation of the signal Sa trend, an area of contact or footprint C-Z is distinguished (localised at approx. 180° in the example illustrated in FIG. 4) where the area of the tyre monitored by the sensor device 3 is found to be in contact with the road surface. Within the area of contact the acceleration $a_z$ diminishes sharply until essentially disappearing, and subsequently increases. Before the tyre, whilst undergoing its rotation, moves the point of observation P into the area of contact C-Z, this is to be found in an input zone IN-Z (contiguous with that of contact) wherein the centripetal acceleration $a_z$ is increasing. When the point of observation P leaves the area of contact C-Z the acceleration signal Sa allows the identification of an exit area OU-Z (contiguous with that of contact) wherein the acceleration $a_z$ is decreasing.

In the parts of the signal Sa outwith the three aforementioned zones (for example, for angles between 0° and 100°) the centripetal acceleration assumes variable values in a reduced amplitude interval.

The Applicant has observed that for the determination of the parameters relating to the roughness of the road surface it is particularly significant to analyse the signal Sa in close proximity to the area of contact C-Z. For example, the portion of the signal which comprises the input zone IN-Z, contact C-Z and exit OU-Z areas is of interest. Furthermore, the Applicant has observed that the area which provides the most information in relation to the roughness of the surface is the input zone IN-Z. This result has been verified experimentally and finds a possible explanation in the fact that the input zone IN-Z, being contiguous with the contact area C-Z where the direct stressing of the structure of the tyre by the road surface takes place, is able to "sense" the stress induced by the roughness of the road surface but is less disturbed by other phenomena associated with the passage under the footprint area, such as for example, the greater or lesser crushing induced by the load.

The parts of the signal Sa on which to perform the analyses for the determination of the aforementioned roughness parameter are determined according to a methodology which will be described in the following, making reference also to FIG. 5, in addition to that of FIG. 2.

The output signal Sa from the measuring device 32 is forwarded to the second low pass filter 54 which reduces or eliminates the high frequency contributions and returns a filtered low pass signal $S_{LP}$. In particular, the low pass filter 54 eliminates or considerably reduces the frequency components due to the stresses endured by the tyre 11 from the road surface.

Figure 5:
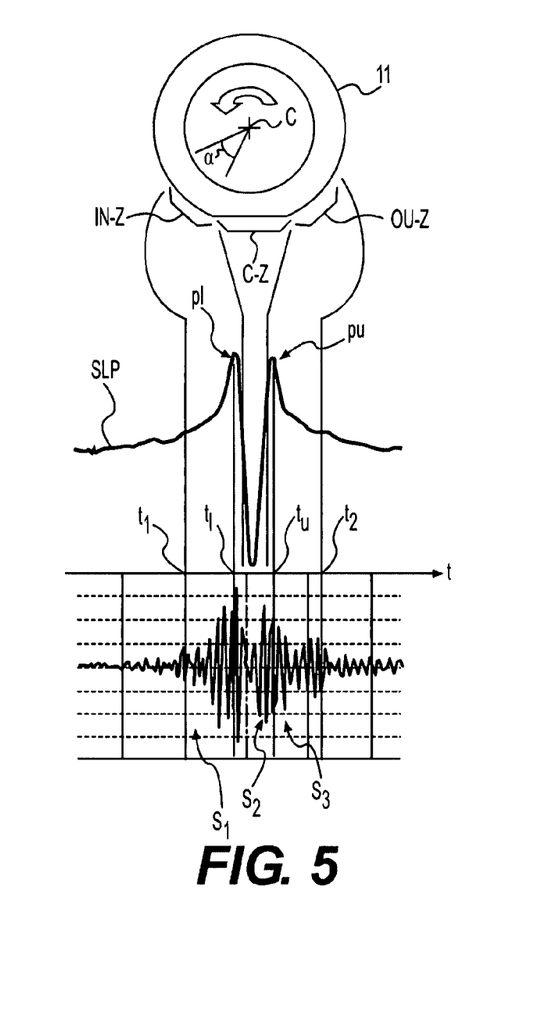
FIG. 5 shows qualitatively the behaviour of a low pass filtered acceleration signal $S_{LP}$ and a band pass filtered acceleration signal $S_{BP}$ obtainable from filtering stages of said sensor device.

In FIG. 5 is shown, qualitatively, the trend of the filtered low pass signal $S_{LP}$ as a function of time t. Furthermore, for greater clarity, in FIG. 5 is also shown the tyre 11, its sense of rotation and on the outer surface of the same tyre are indicated the area of contact with the road surface C-Z (where the tyre undergoes crushing), the input zone IN-Z and the exit area OU-Z.

Analogously to that said for the signal Sa detected by the measuring device 32, the filtered low pass signal $S_{LP}$ has a trend which is increasing up to a first maximum $p_i$ in the input zone IN-Z. In the area of contact C-Z the filtered low pass signal $S_{LP}$ has a trend which is decreasing until reaching a minimum value in order to then increase again until reaching a second maximum value $p_u$. In the exit area OU-Z, the signal $S_{LP}$ has a decreasing trend starting from the second maximum value $p_u$.

The low pass signal $S_{LP}$ is hence forwarded to the analogue digital converter 53 which returns the corresponding digital data which are stored in the memory 35.

Subsequently, an analysis of the stored digital data is carried out aimed at identifying the first maximum $p_i$, the second maximum $p_u$ and the values or time coordinates $t_i$ and $t_u$ according to which such maxima are verified (evaluated by starting from an initial instant).

According to the example described, the analysis which leads to the identification of the time coordinates ($t_i$ and $t_u$) of the maxima $p_i$ and $p_u$ is performed by the processing unit 34 on the basis of a program which executes algorithms obvious for those skilled in the art. It is observed that, instead of the time coordinates, the angles of rotation of the tyre 11 corresponding to the aforementioned maxima may also be estimated.

According to the method of the invention, the amplitude of the input zone IN-Z is fixed by taking into consideration the quantity of data which it is desired to treat in the elaborations which will follow.

For example, the input zone IN-Z has an extension corresponding to an angular sector (estimated at the centre C of the tyre 11) having a preset angle α, which may be wider with the increasing length of the tyre. For example, the angle α may be selected between 30° and 100°. In the case of a car tyre (for example, a tyre of model 195/65/R15) a convenient value of such angle may be equal to around 50°, whilst for a truck tyre the angle may be equal to around 70°. Starting from the value $t_i$, corresponding to the first maximum pi, the angle α allows the identification of another time coordinate $t_1$ (or angular), which delimits the input zone IN-Z.

Analogously, the area of contact C-Z is comprised of between the coordinates $t_i$ and $t_u$. The exit area OU-Z will be included between the time coordinate $t_u$ and another time coordinate $t_2$ obtained by presetting the extension of the exit area OU-Z of interest in a manner analogous to that for the input zone IN-Z. The time coordinates $t_1$, $t_i$, $t_u$, $t_2$ thus determined are hence stored in the memory 35.

Alternatively, the amplitude of the input zone IN-Z and that of the exit area OU-Z may be determined, not on the basis of a pre-established angular aperture angular sector, but by presetting the number of samples acquired for consideration by the subsequent elaborations.

It is noted that the determination stage of the time coordinates $t_1$, $t_i$, $t_u$, $t_2$ (which identify the parts of interest of the acceleration signal) may be repeated with each revolution of the tyre 11.

Furthermore, it is known that for the determination of the time coordinates which identify the parts of interest of the acceleration signal, advantageously, an acceleration signal according to any of the directions X, Y, Z, and not necessarily the centripetal acceleration signal, may be used as exemplificatively described above.

The method of the invention also includes a processing stage (itself repeatable with each revolution of the tyre) which leads to the estimation of the angular velocity $\omega_p$ of the tyre 11 related to a $i^{th}$ revolution of the same.

Advantageously, the estimation of the angular velocity $\omega_p$ is carried out by starting from the centripetal acceleration signal provided by the measuring device 32.

For example, for this estimation the same filtered low pass signal $S_{LP}$, output from the second low pass filter 54, fed into the analogue-digital converter 53 may be used. Alternatively, the signal Sa present at the terminal 50 may be fed directly into the analogue-digital converter 53, or the low pass filtering may be performed by another filter (not shown).

The analogue-digital converter 53, operating in a conventional manner, returns corresponding digital values which are then stored in the memory 35. The calculation operations for the determination of the angular velocity are carried out, for example by the processing unit 34 using these stored digital values.

Preferably, the angular velocity $\omega_p$ is estimated by considering the centripetal acceleration amplitude values, ai, assumed in the areas of interest and, preferably, before and after the area of contact C-Z.

With reference to FIG. 5 it is possible to consider the values $ai_i$ and $au_i$ of the centripetal acceleration, ai, estimated for the time coordinates $t_1$ and $t_2$ which identify the start of the input zone IN-Z and the end of the exit area OU-Z.

On the basis of the value $ai_i$ (centripetal acceleration prior to the area of interest) and the value $au_i$ (centripetal acceleration following the area of interest) a mean acceleration value $ai_m$ is calculated:

$$ai_m = (ai_i + au_i)/2 \quad (3)$$

The angular velocity $\omega_p$ is, therefore, given by the equation:

$$\omega_p = \sqrt{\frac{ai_m}{r_g}} \quad (4)$$

Wherein the inflated radius $r_g$ in relation to the point P of observation has been pre-stored in the memory 35

The value of the angular velocity $\omega_p$, itself also storable in the memory 35, is useful for some of the processing stages of the method of the invention. Furthermore, the same angular velocity $\omega_p$ value may be used in order to modify the cut-off frequency $f_t$ of the second low pass tracking filter 54, for example, in accordance with equation (1') indicated above.

The acceleration signal Sa which from the output terminal 50 is fed into the band pass filtering block 52, during the rolling motion of the tyre 11 is now considered.

The band pass filtering block 52 returns a filtered band pass signal $S_{BP}$ which contains the frequency components the origin of which is referable to the stresses induced by the texture or roughness of the road surface on the structure of the tyre 11. Within such a filtered band pass signal $S_{BP}$ the frequency components due to other phenomena, not of interest, have been strongly attenuated or, essentially eliminated.

FIG. 5 shows qualitatively one possible time trend of the filtered band pass acceleration signal $S_{BP}$.

It is observed that, in the case wherein the filtering block 52 uses the first low pass filter 56 and the high pass filter 57 made with tracking filters and not constant cut-off frequency filters, the processing unit 34 carries out the calculation of the lower $f_l$ and upper $f_i$ cut-off frequencies by applying equations (1) and (2) indicated above, on the basis of the angular velocity $\omega_p$ calculated previously and corresponding to the revolution of the tyre * considered. The processing unit 34 then sends corresponding control signals to the two filters 56 and 57 which impose the value calculated for the cut-off frequency or the nearest possible values allowed by the types of filters to those calculated.

Subsequently, the filtered band pass signal $S_{BP}$ undergoes an analogue-digital conversion in the converter 53 which may envisage the conventional sampling of a given frequency fc, a quantification and an encoding.

The sampling frequency fc is, for example, equal to 10 KHz, and selected in compliance with Nyquist's theorem, and is equal to the number N of samples obtained within a given unit of time.

As already mentioned previously, according to one preferred embodiment of the invention, for the subsequent elaborations the entire acceleration signal resulting from the analogue digital conversion of the filtered band pass signal $S_{BP}$ and relating to a complete revolution of the tyre is not used. Advantageously, for the following elaborations, only those parts of the filtered band pass signal $S_{BP}$ (or, in more detail, of the corresponding digital signal resulting from the conversion) judged to be of interest for the estimation of the roughness of the road surface are taken into consideration.

In particular, those parts of the signal corresponding to the area of contact C-Z and/or the contiguous areas, such as the input zone IN-Z and/or that of exit OU-Z are taken into consideration.

These parts of the signal $S_{BP}$ may be defined by the processing unit 34 on the basis of the time coordinates $t_1, t_i, t_u, t_2$ estimated as described previously and stored in the memory 35. As is represented in FIG. 5, the filtered band pass signal $S_{BP}$ is subdivided into a first calculation portion δ1 limited by the time coordinates $t_1$ and $t_i$, into a second calculation portion δ2 limited by the time coordinates $t_i$ and $t_u$ and a third calculation portion δ3 limited by the time coordinates $t_u$ and $t_2$.

It should be remembered that the angular velocity $\omega_p$ of the tyre 11 (the value of which is stored in the memory 35) is associated with the angular frequency $f_p$ (number of revolutions per unit of time) by the equation: $\omega_p = 2\pi f_p$.

On the basis of the rotational frequency $f_p$ and of the sampling frequency $f_c$, the total number of samples $n_{pt}$ present in the digital signal corresponding to one revolution of the tyre is estimated:

$$n_{pt} = f_c/f_p$$

For each of the three calculation parts δ1, δ2, δ3 the number of samples taken into consideration is an appropriate fraction of the total value $n_{pt}$, correlated with the extension of the specific area of interest. For example, for the first calculation portion δ1 a number of samples n1 equal to $n_{pt}/8$ may be selected.

Analogously, for the remaining calculation parts δ2 and δ3 a corresponding number of samples are selected to be used, n2 and n3. On the basis of these samples, a parameter significative of the roughness of the road surface is calculated. According to one preferred form of execution of the invention such a parameter is a mean of values assumed by the low pass filtered signal $S_{BP}$. In particular, the estimated parameter is a quadratic mean.

In greater detail, the processing unit 34 performs the calculation of an energy parameter indicated by the symbol OLj (wherein the initials OL are derived from the term "Overall Level", i.e. the overall surface level) expressed as a quadratic mean of the amplitude values assumed by the acceleration signal and having the following equation:

$$OLj = \frac{1}{nj-1}\sqrt{\sum_{k=1}^{nj} ai_k^2} \quad (5)$$

wherein:

$ai_k$ is the amplitude of the acceleration ai (radial in nature according to the example described herein) corresponding to the $k^{th}$ sample, the index j (which may assume the values, 1, 2, 3) identifies the particular calculation portion δ1, δ2 or δ3 for which the parameter OLj is estimated (for example, this may be estimated for all three parts of the digitally converted low pass filtered signal $S_{BP}$)

The summation indicated in the equation (5) is extended over the number nj of the samples making part of the $j^{th}$ calculation part.

As already mentioned previously, the value of the parameter OLj obtained in the calculation part δ1 corresponding to the input zone IN-Z is particularly significant of the roughness to be measured. For example, according to one particular embodiment of the invention the estimation of the parameter OLj is not carried out for the calculation areas δ2 and δ3, but only the information deduced from the first calculation area δ1 is taken into consideration. Alternatively, by also repeating the calculation for one or both of the other areas δ2 and δ3 it is then made possible to average the parameter OLj obtained from the first calculation area with the values of the parameter OLj deduced from the second and/or the third area of the calculation δ2 and/or δ3.

Advantageously, the calculation of the energy parameter OLj may be performed not only by starting from the radial or centripetal acceleration signal Sa, but also from the acceleration signal relating to another direction or even all the other directions such as, the longitudinal direction X and lateral direction Y.

In the case wherein two or three of the acceleration signals obtainable from a measuring device 32, such as a triaxial accelerometer, are used, the sensor device 3 is equipped with a suitable signal processing stage. For example, in such a case, the sensor device 3 may also comprise at least one other filtering block, analogous to the block 52, for filtering the longitudinal or lateral acceleration signal. The other calculation operations may be performed by the processing unit 34 equipped with adequate processing power.

It is also noted that the calculation of the energy parameter $OL_j$ may also be performed not in an individual sensor device 3 but by many sensor devices analogous to those described and mountable in various observation points within the tyre 1.

The form of execution which envisages, besides the sensor device 3 placed in the centre line of the tyre 11, as shown in FIG. 1, an additional two sensor devices fixed laterally to it within the area of the tread 18 towards the sidewalls 19 and 19', or, for example, placed on the sidewalls themselves, is particularly advantageous.

The sensor device 3 placed in the centre line of the tyre 11 is advantageous for the calculation of the energy parameter OLj during the advancement of the vehicle in a straight line. Whilst, each of the sensor devices placed towards the sidewalls 19 and 19' may be useful for the calculation of the energy parameter OLj during a curve.

Having three sensor devices available, it is possible to establish, for example, by using appropriate software, taking into consideration only one of the OLj parameters provided by them. For example, it may be decided to take into account only the signal originating from one of the three installed sensor devices which ensures the best operation under those particular operating conditions (for example, on the basis of the characteristics of the tread, or the convergence or the camber).

The parameter OLi, as a function of the acceleration of the point of the tyre 11 at the frequency of interest and in the area of interest, is significative of the roughness of the road surface. The value of the energy parameter OLj is calculatable in real time and, adantageously, with each revolution of the tyre 11.

Therefore, the processing unit 34 may make one or more digital signals Sp, indicative of the parameter OLj and therefore representative of the roughness of the road surface on which the tyre 11 is rolling, available over the output line $OU_L$.

This signal Sp is then treated (for example, amplified and modulated) by the transceiver device 31 which, through the antenna 37, forwards it to the fixed unit 2 installed on board the vehicle.

It is noted that the calculation operations of the above described energy parameter may be performed, all or in part, not by the sensor device 3, but by the fixed unit 2.

A particular example of the application of the method of the invention will now be described. This application will be described with reference to an experiment carried out by the Applicant, but the methods with which such an experiment has been carried out may be used, more generally, for performing a characterisation of the different roughness exhibited by road surfaces of differing textures.

Three different road surfaces having distinct MPD ("mean profile depth") parameter values have been considered. The MPD parameter is an indicator normally used in order to define the texture level of the surfaces and is defined by the ISO 13473-1 standards.

The three different road surfaces considered have the following MPD values: 0.6 ("very smooth" typology surface); 1.0 ("medium" typology surface) and 1.8 ("very rough" typology surface).

For these surfaces the value of the energy parameter OLj has been estimated with the varying angular velocity $\omega_p$ of the tyre, using a sensor device and a calculation methodology analogous to those described above. In particular, in these tests a tyre produced by the applicant, Pirelli model P7 225/55R16 has been used, inflated to a pressure equal to 2.2 bar, with a static load of 440 Kg and mounted on the front right axle of a vehicle. The tests have been carried out at a velocity of advancement for the vehicle comprised of between 20 and 100 Km/h.

Furthermore, in order to calculate the OLj parameter the radial acceleration signal Sa taken from a sensor device 3 placed, not in the centre line as shown in FIG. 1, but laterally with respect to the centre line of the tyre, within the half facing towards the vehicle has been taken into consideration. For these experimental tests, the input zone IN-Z has been taken into consideration.

The OLj parameter has been calculated (using equation (5)) in real time, with each revolution of the wheel, and for each of the three surfaces considered. Advantageously, a subsequent averaging operation has been performed which envisages the weighting of the value of the OLj parameter of the individual revolution with a value of the same parameter estimated at least one revolution previously. In particular, for this mean, four consecutive revolutions have been considered and a variable quadratic mean has been performed.

Such a method has the advantage of increasing the stability of the information obtained by the real time calculation and reducing the influence of casual (or random) stresses originating from the gross irregularities of the road surface and underlining the differences in the energy parameter OLj as a function of the characteristics of the test surfaces in terms of roughness.

In detail, the averaged energy parameter $\overline{OLj}_{(k)}$ in relation to the $k^{th}$ revolution has given the equation:

$$\overline{OLj_{(k)}} = \sqrt{OLj_{(k-4)}^2 + OLj_{(k-3)}^2 + OLj_{(k-2)}^2 + OLj_{(k-1)}^2 + OLj_{(k)}^2} \quad (6)$$

The equation (6) expresses a variable mean in that the values of the energy parameter that it considers are updated during the motion of the tyre and, in particular, with each revolution of the same. The averaged energy parameter $\overline{OLj}(k)$ has been estimated, for each of the three surfaces, for some values of the angular velocity $\omega_p$.

Subsequently, an interpolating curve of the values of the averaged energy parameter $\overline{OLj}(k)$ and related to each of the three surfaces considered has been identified.

For example, suitable interpolating curves are described by second degree polynomials $OLj(\omega)$ within the angular velocity variable $\omega$, having the following form:

$$OLj(\omega) = a\,\omega^2 + b\,\omega + c$$

Wherein a, b and c are the coefficients of the interpolating polynomial.

Figure 6:
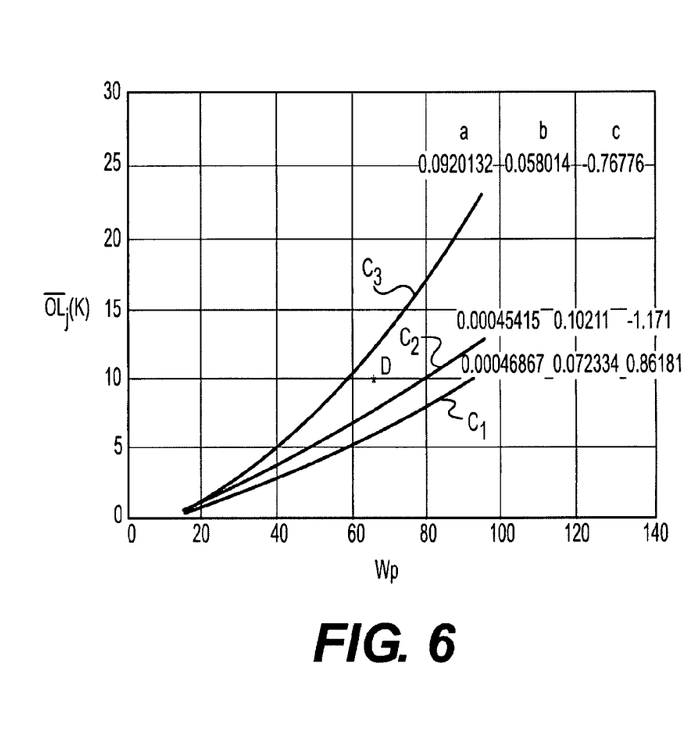
FIG. 6 shows three curves, obtained under a first experimental condition, expressing the trend of a roughness parameter as a function of the angular velocity of the tyre and which characterise three different tyre rolling surfaces.

In FIG. 6 are shown the interpolating curves C1 (in relation to the very smooth surface), C2 (in relation to the medium surface) and C3 (in relation to the very rough surface) obtained under the experimental conditions indicated above. Next to each curve C1, C2 and C3 are indicated the numerical values of the coefficients a, b and c (from left to right). Each curve of FIG. 6 equates the angular velocity $\omega_p$ expressed in rad/s (indicated on the X axis) with values of the averaged energy parameter (on the Y axis).

From observation of FIG. 6 a clear distinction of the curves C1, C2 and C3 is noted, above all for angular velocity values greater than 40 rad/s, and it may be ascertained how the energy parameter values are much higher for the very rough surface (curve C3), less for the medium surface (curve C2) and even less still for the very smooth surface (curve C1).

This result shows how the calculation of the energy parameter carried out in accordance with the invention is effectively significative of the texture of the road surface.

According to one form of preferential execution of the invention, digital data corresponding to the curves C1, C2 and C3 are memorised within the memory 28 of the fixed unit 24 in such a manner as to constitute reference curves in order to allow the characterisation of the road surface on which the moving vehicle is found. For example, the formula of the interpolating curve and the corresponding interpolation coefficients may be stored in the memory.

The sensor device 3 can transmit, for example for each revolution of the wheel, a signal corresponding to the calculated value of the energy parameter OLj (estimated according to equation (5)) together with another signal which contains the angular velocity value of the tyre $\omega_p$ (estimated according to equation (4)).

The processing unit of the fixed unit may receive these signals and use the values of the energy parameter and the angular velocity as coordinates of a point D to be identified on the diagram of FIG. 6. By determining that curve, between the curves C1, C2 and C3, which is closest to the point D, the type of surface on which the vehicle is found may be classified and establish whether one is dealing with a very smooth, medium or very rough surface.

This information may be made available by the fixed unit 2 to another apparatus placed on board the vehicle such as, for example, an ABS control system which may, hence, operate on the basis of additional descriptive information of the conditions of motion of the vehicle and modify, for example, one or more operating parameters which have influence over the behaviour of the vehicle itself.

Figure 7:
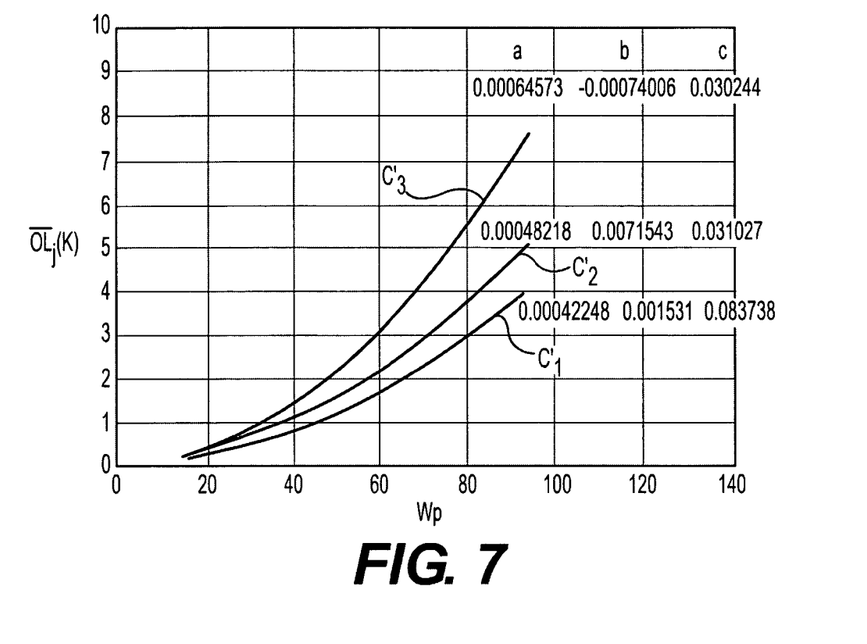
FIG. 7 shows another three curves analogous to those of FIG. 6 but deduced under a second experimental condition.

FIG. 7 shows a diagram with three curves C1', C2' and C3' obtained in an analogous manner and under the same experimental conditions described for curves C1, C2 and C3 of the diagram in FIG. 6 at least for the fact that the averaged energy parameter $\overline{OLj}$ (k) has been estimated by starting from the not radial Z, but longitudinal acceleration signal X provided by the measuring device 32. In FIG. 7, next to each interpolating curve, are indicated the values of the coefficients a, b and c which define the corresponding second degree interpolation polynomial used for the specific experimental test. For the curves C1', C2' and C3' the same considerations regarding the possibility of the distinction of the three surface typologies made for those of FIG. 6 are valid.

That shows, how the method of the invention, even though it has been described with reference to the radial acceleration signal, is valid even when using an acceleration signal referring to the other directions of the tyre.

Figure 8:
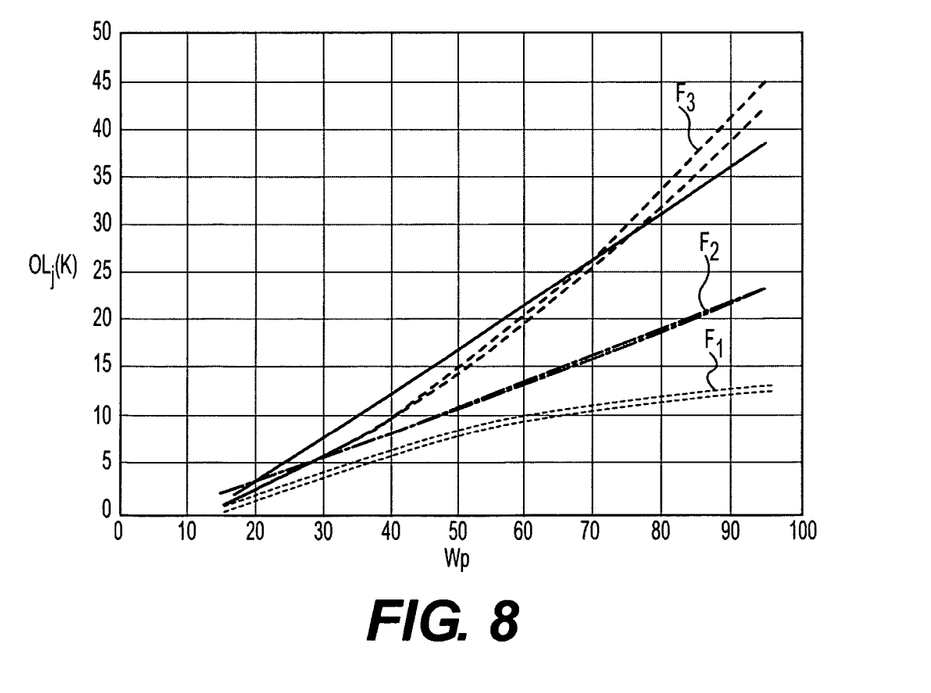
FIG. 8 shows, for three different models of tyre, three curves analogous to those of FIG. 6 and related to three distinct tyre rolling surfaces.

FIG. 8 shows interpolating curves obtained with the above described method and under the same experimental conditions (by the processing of a radial acceleration signal) on the same Cartesian plane for three different models of tyre: Pirelli P6000 205/55R16, Pirelli P7 205/55R16 (as used for the curves in FIG. 6) and Pirelli Pzero 205/55R16.

In FIG. 8 are shown three families of curves, wherein each curve is correspondent to one of the models listed above: the F1 family, related tom the very smooth surface; the F2 family, related to the medium surface, the F3 family, related to the very rough surface.

From observation of FIG. 8 it is observed that, varying with the model of the tyre, a clear distinction between the family of curves estimated for the three different surfaces is still observed, especially above an angular velocity of approx. 40 rad/s.

The three curves of each family do not differ much between one another. In other words, the above described methodology for obtaining information on the roughness of the tyre rolling surface seems to be essentially independent of the structure of the tyre. Nevertheless, the Applicant believes that for the characterisation of the road surface on which a vehicle travels, having a particular model of tyre, it is more convenient to memorise the reference curves obtained from measurements performed using the same model of tyre.

According to an additional form of application of the present invention, during the motion of the vehicle it is possible to store the values of the energy parameter OLj with reference to several revolutions of the tyre, in such a manner as to estimate the variance (or the mean quadratic difference) of these values in order to obtain information on the general characteristics of a long section of road such as, for example, indications about the uniformity or the irregularity of the surface of the section of road considered.

The teachings of the present invention are particularly advantageous since they allow the determination of a parameter which characterises the texture/roughness of the surface on which the vehicle in motion is found. This parameter has significant importance if, for example, it is then made available for an on board system such as an ABS (Anti Blocking System) control system.

The invention claimed is:

1. A method for determining the roughness of a rolling surface of a tyre, comprising:
providing, by means of a sensor device operatively associated with the tyre, a first signal representative of the motion of at least one point of the tyre during the tyre's rolling on the surface;
processing the first signal for providing an output indicative of the roughness of said rolling surface of the tyre; and
wherein the processing includes a frequency filtering of the first signal for extracting a second signal representative of motion components of said at least one point due to the deformations undergone by the tyre during the rolling.

2. The method according to claim 1, wherein the processing comprises a data processing of at least one portion of said second signal for calculating at least one parameter indicative of the roughness of the rolling surface.

3. The method according to claim 2, wherein the processing comprises defining said at least one portion of the second signal on the basis of temporal/angular coordinates, said at least one portion being correspondent to one between the contact zone and the contiguous zone.

4. The method according to claim 2, wherein the processing includes:
filtering the first signal for extracting the second signal;
carrying out an analogue digital conversion for obtaining digital data corresponding to said second signal; and
elaborating at least part of said digital data and providing an output signal carrying the current parameter indicative of the roughness of the surface on which the rolling of the tyre occurs.

5. The method according to claim 4, wherein said elaborating at least part of the digital data comprises calculating a mean of values associated with a pre-selected number of digital samples.

6. The method according to claim 4, further comprising a data pre-storage which defines at least one first reference curve representative of a first trend of the roughness parameters measured with varying angular velocity of the tyre, the first reference curve being indicative of a first class of roughness associated with a first reference rolling surface.

7. The method according to claim 6, further comprising an additional data pre-storage which defines a second reference curve representative of a second trend of roughness parameters measured with the varying angular velocity of the tyre, the second reference curve being indicative of a second class of roughness distinct from the first class and associated with a second reference rolling surface.

8. The method according to claim 6, further comprising:
receiving the output signal carrying the current parameter;
receiving an additional output signal indicative of the current angular velocity assumed by the tyre essentially during the measurement of the current parameter; and
performing a comparative elaboration of the current parameter with the values of said at least first reference curve, in such a manner as to establish a roughness typology, to which the surface on which the rolling of the tyre is occurring belongs, essentially during the measurement of the current parameter, the comparative elaboration being carried out by taking account of present angular velocity.

9. The method according to claim 1, wherein the first signal is an acceleration signal representative of the acceleration of said at least one point of the tyre during rolling of the tyre on the surface.

10. The method according to claim 9, wherein said acceleration signal comprises at least one of the following accelerations of at least one point of the tyre: radial acceleration, longitudinal acceleration, or lateral acceleration.

11. The method according to claim 1, wherein the first signal is representative of the motion of said at least one point during a revolution of the tyre, said processing comprising:
determining first temporal/angular coordinates corresponding to a first portion of the first signal associated with the rolling of the tyre, wherein said at least one point is in a zone of contact of the tyre with the rolling surface; and
determining at least on second temporal/angular coordinate corresponding to a second portion of the first signal associated with the rolling of the tyre wherein said at least one point is in a zone contiguous with said contact zone.

12. The method according to claim 11, wherein said contiguous zone is an input zone which precedes said contact zone according to the sense of rotation of the tyre.

13. The method according to claim 11 wherein the processing comprises defining said at least one portion of the second signal on the basis of temporal/angular coordinates, said at least one portion being correspondent to one between the contact zone and the contiguous zone.

14. The method according to claim 12, wherein said input zone corresponds to an angular sector of the tyre having a present angle of aperture.

15. The method according to claim 1, wherein the processing comprises estimating the angular velocity of the tyre during the rolling of the tyre.

16. The method according to claim 15, wherein the estimating comprises calculating the angular velocity on the basis of at least one value of the centripetal acceleration of the tyre and on the basis of the radius of the tyre.

17. A method for controlling the behaviour of a vehicle to which at least one tyre is mounted, comprising:
determining information relating to the roughness of a rolling surface of the tyre in accordance with a method according to claim 1; and
making available the information relating to the roughness to a vehicle control system.

18. The method according to claim 17, wherein said control system is an Anti Blocking System.

19. A system for determining the roughness of a rolling surface of a tyre to be mounted onto a vehicle, the system being operatively associable with the tyre and comprising:
a sensor device operatively associated with the tyre for providing a first signal representative of the motion of at least one point of the tyre during a rolling of said tyre on a surface having a respective roughness;
a processing stage of the first signal for generating an output indicative of the roughness of said tyre rolling surface; and
wherein the processing stage is of such a type as to perform a frequency filtering of the first signal for extracting a second signal representative of components of motion of said at least one point due to deformations undergone by the tyre during rolling.

20. The system according to claim 19, wherein the processing stage performs an elaboration of at least one part of said second signal for calculating at least one parameter indicative of the roughness of the rolling surface.

21. The system according to claim 20, wherein the processing stage comprises identifying said at least one portion of the second signal on the basis of temporal/angular coordinates, said at least one portion being correspondent to one between the contact area and the contiguous area.

22. The system according to claim 20, wherein said processing stage comprises a band pass filtering block for providing said second signal by starting from the first signal.

23. The system according to claim 22, further comprising:
an analogue-digital converter for obtaining data corresponding to said second signal and having associated a prefixed sampling frequency; and
a memory device capable of storing at least said digital data.

24. The system according to claim 23, wherein said processing stage comprises a processing unit for elaborating at least part of said digital data and providing the at least one parameter indicative of the roughness of the rolling surface.

25. The system according to claim 21 or 24, wherein said at least one portion of samples to be processed by the processing unit is determined as a function of sampling frequency and as a function of an extension between said contiguous zone and said contact zone.

26. The system according to claim 25, further comprising a transmission device connected to said processing stage and equipped with a first antenna in order to irradiate at least one external signal.

27. The system according to claim 26, wherein said at least one external signal carries information content of the first signal.

28. The system according to claim 27, further comprising:
a fixed unit installable on a vehicle and including a second antenna coupled to a reception device in order to receive said external signal; and
an additional processing unit connected to a reception device in order to process the external signal received.

29. The system according to claim 26, wherein said at least one external signal carries information indicative of the roughness of the tyre rolling surface.

30. The system according to claim 26, wherein said at least one external signal comprises a velocity signal representative of present angular velocity of the tyre during its rolling.

31. The system according to claim 22, wherein said band pass filtering block has a passing band of 300 Hz to 5000 Hz.

32. The system according to claim 31, wherein said band pass filtering block has a passing band of 300 Hz to 2500 Hz.

33. The system according to claim 22, wherein said filtering block comprises at least one tracking filter having a respective cut-off frequency modifiable as a function of the angular velocity of rotation of the tyre and correlated with a factor dependent on the number of block patterns present on the tread of said tyre.

34. The system according to claim 19, wherein said sensor device comprises an accelerometer and the first signal is an acceleration signal representative of the acceleration of said at least one point of the tyre during rolling on the surface.

35. The system according to claim 34, wherein said acceleration signal comprises at least one of the following tyre accelerations: radial, longitudinal, or lateral.

36. The system according to claim 19, wherein the first signal is representative of the motion of said at least one point during one revolution of the tyre and the processing stage comprises processing the first signal in order to determine temporal/angular coordinates corresponding to:
a first portion of the first signal associated with a rolling stage of the tyre wherein said at least one point is found in a zone of contact with the surface; and
a second portion of the first signal associated with a rolling stage of the tyre wherein said at least one point is found in a zone contiguous to said contact zone.

37. The system according to claim 36, wherein said contiguous zone is an input zone which precedes said contact zone according to the sense of rotation of the tyre.

38. The system according to claim 37, wherein said input zone corresponds to an angular sector of the tyre having a prefixed angle of aperture.

39. The system according to claim 36, wherein the processing stage comprises identifying said at least one portion of the second signal on the basis of temporal/angular coordinates, said at least one portion being correspondent to one between the contact area and the contiguous area.

40. The system according to claim 19, wherein the processing stage comprises estimating the angular velocity of the tyre assumed during the rolling of the same.

41. The system according to claim 40, wherein the processing stage comprises estimating the angular velocity on the basis of at least one centripetal acceleration value of the tyre and on the basis of a tyre radius.

42. The system according to claim 19, wherein said sensor device is capable of being fixed to the tyre.

43. The system according to claim 19, wherein said sensor device is capable of being fixed to a supporting rim of the tyre.

44. A tyre for a vehicle, comprising:
a sensor device operatively associated with the tyre for providing a first signal representative of the motion of at least one point of the tyre during a rolling of said tyre on a surface having a respective roughness, said sensor device comprising a processing stage of the first signal for generating an output indicative of roughness of said tyre rolling surface; and
wherein the processing stage is so as to perform a frequency filtering of the first signal for extracting a second signal representative of motion components of said at least one point due to deformations undergone by the tyre during rolling.

45. The tyre according to claim 44, wherein the processing stage is capable of performing the processing of at least one portion of said second signal for calculating at least one parameter indicative of the roughness of the rolling surface.

46. The tyre according to claim 44, wherein said sensor device comprises an accelerometer and the first signal is an acceleration signal representative of acceleration of said at least one point of the tyre during rolling on the surface.

47. The tyre according to claim 46, wherein said acceleration signal comprises at least one of the following tyre accelerations: radial, longitudinal, or lateral.

48. The tyre according to claim 44, wherein the sensor device comprises a casing fixed to one wall of the inside of the tyre by means of a fixing element.

49. The tyre according to claim 44, comprising at least one additional sensor device operatively associable with the tyre for providing an additional correspondent signal representative of the motion of at least one additional point of the tyre during the rolling of said tyre on the surface.

50. A wheel comprising a supporting rim and a tyre in accordance with claim 44 associated with said supporting rim.

* * * * *

UNITED STATES PATENT AND TRADEMARK OFFICE
CERTIFICATE OF CORRECTION

PATENT NO. : 7,756,670 B2  Page 1 of 1
APPLICATION NO. : 10/577251
DATED : July 13, 2010
INVENTOR(S) : Mancosu et al.

It is certified that error appears in the above-identified patent and that said Letters Patent is hereby corrected as shown below:

Claim 2, column 17, line 20, "comprises a data processing" should read

--comprises data processing--.

Claim 11, column 18, line 17, "at least on" should read

--at least one--.

Signed and Sealed this
Fourteenth Day of June, 2011

David J. Kappos
*Director of the United States Patent and Trademark Office*